United States Patent [19]

Erke

[11] Patent Number: 5,441,371
[45] Date of Patent: Aug. 15, 1995

[54] MULTIPLE WINCH MOUNTING ON A VEHICLE TRAILER

[76] Inventor: Fred Erke, 706 Perkinwood SE., Warren, Ohio 44483

[21] Appl. No.: 332,133

[22] Filed: Oct. 31, 1994

[51] Int. Cl.⁶ .............................................. B61D 45/00
[52] U.S. Cl. ..................................... 410/100; 410/103
[58] Field of Search ...................... 410/100, 98, 97, 96, 410/101, 120, 34, 12, 106, 103, 104, 108, 35, 36, 37

[56] References Cited

U.S. PATENT DOCUMENTS

| | | | |
|---|---|---|---|
| 3,520,555 | 7/1970 | Blair | 410/100 |
| 3,697,045 | 10/1972 | Farley | 410/103 |
| 4,369,009 | 1/1983 | Fulford | 410/100 X |
| 4,382,736 | 5/1983 | Thomas | 410/100 X |
| 5,118,232 | 6/1992 | Shuker | 410/100 X |
| 5,234,298 | 8/1993 | Shuker | 410/100 X |

*Primary Examiner*—Michael S. Huppert
*Assistant Examiner*—James Eller
*Attorney, Agent, or Firm*—Harpman & Harpman

[57] ABSTRACT

A belt winch mounting apparatus for use on flat bed trailers using a single mounting support shaft on which winch elements can be selectively secured therealong. The mounting support shaft is secured to the trailer on one side with independent winch elements rotatably positioned thereon. Ratchet supports extend from the trailer for engagement with the winch configuration, as required.

8 Claims, 2 Drawing Sheets

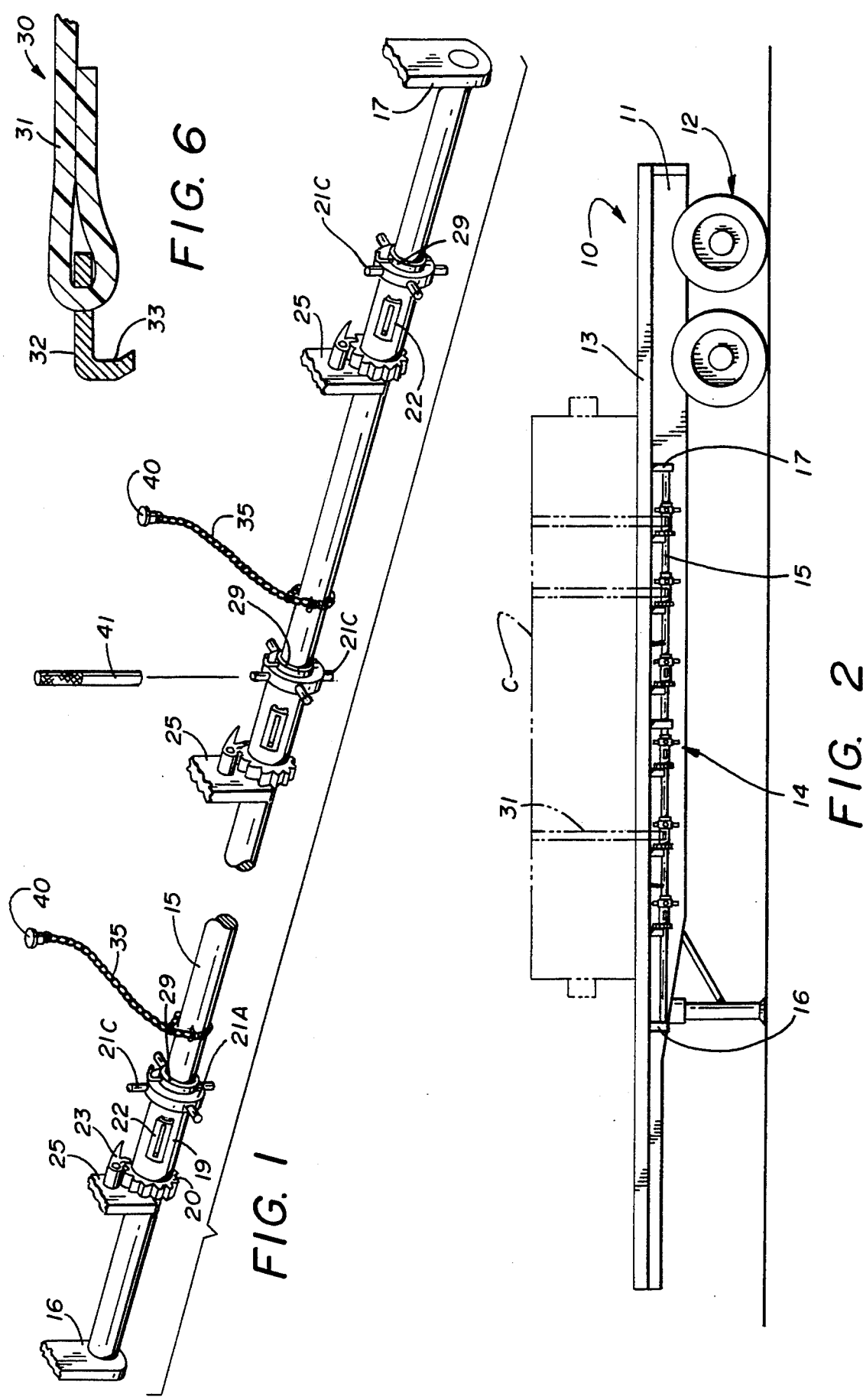

MULTIPLE WINCH MOUNTING ON A VEHICLE TRAILER

BACKGROUND OF THE INVENTION

1. Technical Field

This invention relates to flatbed truck trailers and the like which use tie-down straps to hold cargo on the trailer's bed. Heretofore independent winches are secured along the side of the trailer bed from which hold down straps extend.

2. Description of Prior Art

Prior art devices of this type have relied on a variety of different winch mounting configurations, see for example U.S. Pat. Nos. 3,520,555, 4,369,009, 4,382,736, 5,118,232 and 5,234,298.

In U.S. Pat. No. 3,520,555 a bale pack tie down device is disclosed in which multiple tie down engagement body members are used to extend from the trailer-bed to tension tie down ropes extending opposite sides of the trailer.

Referring to U.S. Pat. No. 4,369,009 a load carrying system which uses a single winch is disclosed with a continuous tie down cable that extends over the load and then over multiple support guides associated with the winch.

Referring to U.S. Pat. No. 4,382,736 a belt winch mounting apparatus for a trailer is disclosed having a self-contained winch assemblies that are selectively positioned along a mounting rod. Each of the assemblies hang from the rod by a mounting bracket.

U.S. Pat. No. 5,118,232 is directed to a quick tie system having opposing tie down drive shafts both driven from a central gear box rotating the drive shafts in oppositely disposed directions by a chain drive so as to provide a winch element on opposite sides of the trailer.

SUMMARY OF THE INVENTION

This invention provides an improvement in a cargo securing system using multiple self-contained strap winches positioned on a vehicle's flatbed truck assembly. A central mounting and support shaft extends along one side of the trailer on which are rotatably positioned winch assemblies. Support straps extend from the winch assemblies extending over the cargo and are secured to the opposite side of the flatbed trailer or the like. Each winch has multiple engagement drive pins for selective rotation and a ratchet mechanism for selective engagement and holding under tension of the cargo strap extending therefrom.

DESCRIPTION OF THE DRAWINGS

FIG. 1 is an enlarged perspective view of the winch apparatus broken away from the trailer;

FIG. 2 is a side elevational view of a trailer with a winch apparatus of the invention positioned thereon;

FIG. 6 is an enlarged sectional view of a portion of a tie down strap; and

DESCRIPTION OF THE PREFERRED EMBODIMENT

Figure 3:
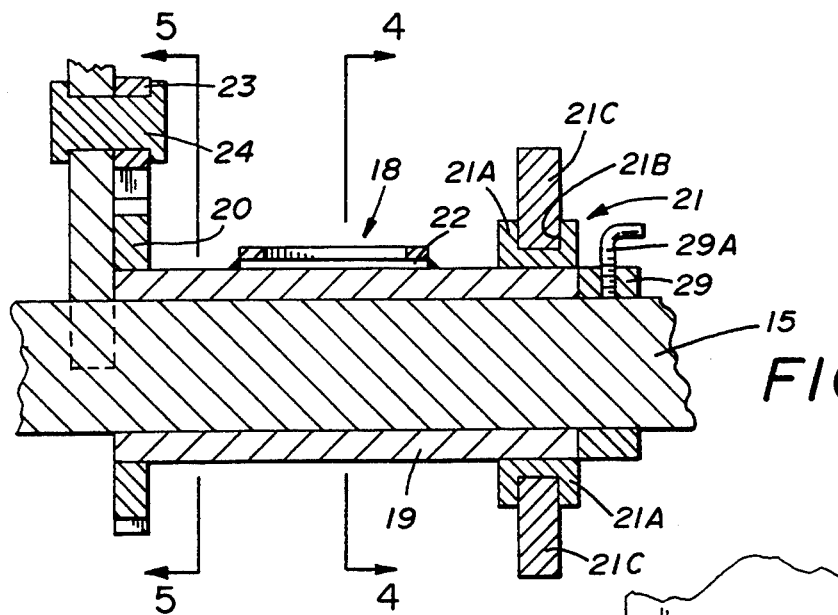
FIG. 3 is an enlarged cross-sectional view on lines 3—3 of FIG. 1 of the drawings.

Referring to FIG. 2 of the drawings, a flatbed trailer 10 can be seen having a main frame 11, a wheel and axle assembly 12 and a trailer bed 13 all of which is well known to those skilled in the art. A trailer winch assembly 14 can be seen secured along the main frame 11 below the trailer bed 13. Referring to FIGS. 1 and 2 of the drawings, the trailer winch assembly 13 has a support and mounting rod 15 extending between terminal support brackets 16 and 17 respectively that extend from said trailer bed 13. A plurality of winch elements 18 are positioned along the support and mounting rod 15 in selective spaced intervals as required by the use configuration chosen for illustration.

Figure 4:
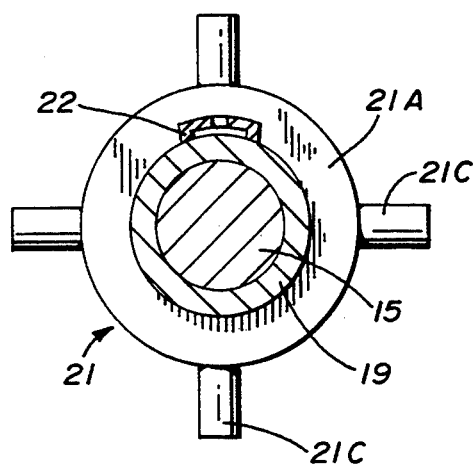
FIG. 4 is an enlarged cross-section on lines 4—4 of FIG. 3 of the drawings.

Each of said winch elements 18 have a cylindrical body member 19 with a winch gear 20 on one end thereof and a drive pin assembly 21 inwardly of said oppositely disposed end, best seen in FIG. 3 of the drawings. Each of the cylindrical body members 19 has an upstanding strap engagement clamp 22 positioned between said respective winch gear 20 and said drive rod assembly 21, best seen in FIGS. 1, 3 and 4 of the drawings. The clamp 22 has a longitudinally extending slot S therein which will be described in greater detail hereinafter.

Each of said drive pin assemblies 21 has an annular body member 21A with multiple sockets 21B within. A plurality of engagement rods 21C extend from said respective sockets therefrom in spaced oppositely disposed relation to one another completing the drive pin assembly 21.

Figure 5:
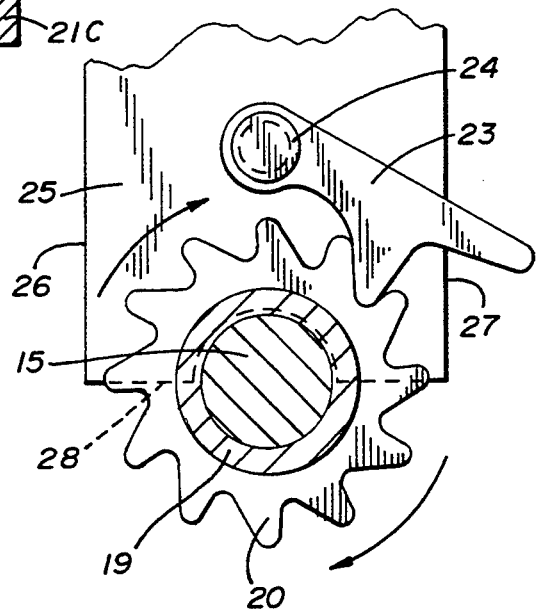
FIG. 5 is an enlarged cross-section on lines 5—5 of FIG. 3 of the drawings.

A rack engagement pawl 23 is positioned for selective engagement with said winch gear 20 providing for restrictive segmented rotation of the winch gear 20 in one direction as illustrated by arrows in FIG. 5 of the drawings as will be well known by those skilled in the art. Each rack engagement pawl 23 is pivotally secured on a pivot rod fitting 24 extending from a support plate 25 that extends from the trailer bed 13. The support plate 25 has spaced parallel side edges 26 and 27 and a notched area at 28 to accommodate passage of the support and mounting rod 15.

Referring now to FIG. 3 of the drawings, a stop ring 29 can be seen positioned on the supporting and mounting rod 15. The stop ring 29 has a set screw lever 29A threadably extending therethrough for locking engagement against the mounting and support rod 15.

Referring to FIGS. 1–6 of the drawings, a tie down strap and clasp assembly 30 can be seen for registration with said upstanding engagement clamp 22 on the cylindrical body member 19. The tie down strap and clasp assembly 30 has a flexible strap 31 on which a clasp 32 is positioned which has a down-turned and inturned flange 33 extending at right angles from its free end. The strap 31 extends through the clasp 32 and returns on itself as best seen in FIG. 6 of the drawings.

Figure 7:
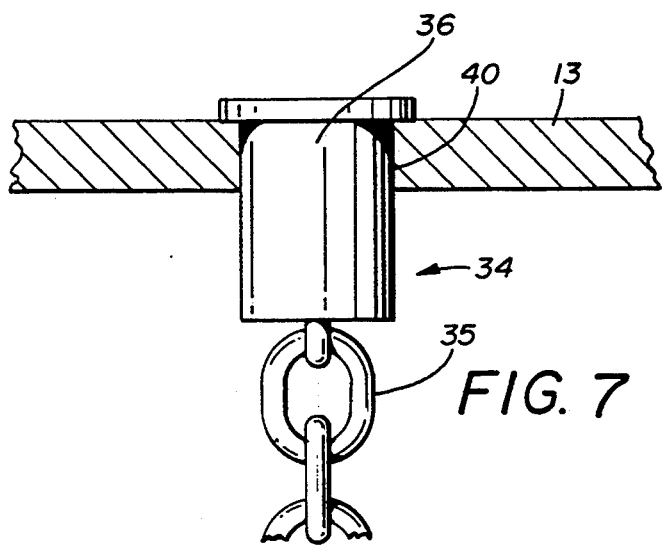
FIG. 7 is an enlarged side elevation of a portion of a retractable tie down chain and plug assembly.

Referring now to FIGS. 1 and 7 of the drawings, a chain tie down and plug assembly 34 can be seen wherein a tie down chain 35 is looped around the support and mounting rod 15 with a bed plug 36 secured to the opposite end of said chain for insertion into an aperture at 40 in the trailer bed 13. The bed plug 36 has a cylindrical body member 37 with an annular flange 38 on one end thereof. A chain engagement loop 39 extends from the oppositely disposed end from which the chain 35 extends.

It will be apparent that in use the winch assemblies 18 are initially positioned along the support rod 15 between selective support plates 25 and stop rings 29 dependent on the desired locations in regard to the load configuration which is to be secured. The winch assembly thus positioned is provided for free rotation on the mounting and support rod dependent on the engagement of the ratchet pawl 23 on the support plate 25 engaging the respective ratchet gear 20 which provides for incremental controlled advance by rotation of the body member 19 on the support rod 15.

Rotation of the trailer winch assembly 14 is achieved by use of a handle 41, best seen in FIG. 1 of the drawings which is selectively engaged over the drive pins 21C advancing same with the ratchet gear 20 against the ratchet pawl 23 hereinbefore described. As the cylindrical body member 19 is rotated, the upstanding engagement clamp 22 advances winding up the tie down strap 31 which typically extends over a cargo C on the trailer bed S shown in broken lines in FIG. 1 of the drawings, thus securing the cargo thereon.

It is clear from the above referred to description that the selective movable placement of the winch assemblies 14 provides for a wide variety of winch placement scenarios on a single mounting and support rod which acts as the rotatable support element for each of the winch assemblies.

A secondary mounting and support rod is positioned on the trailer's opposite side providing for alternate winch positioning or tie down chains 35 thereon as required in different use configurations.

Thus ill will be seen that a new and useful winch assembly has been illustrated and described and it will be apparent to those skilled in the art that various changes and modifications may be made therein without departing from the spirit of the invention.

Therefore I claim:

1. A belt winch mounting apparatus for use on vehicle trailers having a main support frame and a trailer bed on which cargo loads are transported, the belt winch mounting apparatus comprises a main support rod secured to said trailer adjacent and below said trailer bed, multiple winch assemblies rotatably positioned on said support rod, each of said winch assemblies comprising a cylindrical main body member, a ratchet gear, and a drive rod assembly, a support plate extending from said trailer bed to said support rod, a winch pawl mounted on said support plate in registration relation with said ratchet gear, a strap engagement clasp on said body member, a tie down strap and clasp assembly engageable within said strap engagement clasp, means for incrementally rotating said winch assembly on said support rod, a tie down chain secured to and extending from said support rod through said trailer bed, a bed plug secured to said free end of said tie down chain registerable within said trailer bed and means for selectively positioning said winch assemblies on said support rod.

2. The belt winch mounting apparatus of claim 1 wherein said drive rod assembly comprises an annular body member, multiple sockets in said body member, engagement rods within said sockets in oppositely disposed relation to one another extending therefrom.

3. The belt winch and mounting apparatus of claim 1 wherein said main support rod is of a known outside diameter and said winch assembly cylindrical body member is of an inside diameter greater than that of said known outside diameter.

4. The belt winch and mounting apparatus of claim 1 wherein said support plate has a contoured bottom engageable on said support rod.

5. The belt winch and mounting apparatus of claim 1 wherein said tie down strap and clasp assembly comprises a transversely flat band of flexible material, a clasp secured to said flexible band, said clasp having a right angular down-turned and inturned flange engageable in said strap engagement clasp.

6. The belt winch and mounting apparatus of claim 1 wherein said strap engagement clasp comprises an upstanding slotted element on said cylindrical body member.

7. The belt winch and mounting apparatus of claim 1 wherein said means for incrementally rotating said winch assembly on said support rod comprises a drive handle engageable on said drive rod assembly.

8. The belt winch and mounting apparatus of claim 1 wherein said means for selectively positioning said winch assembly on said support rod comprises a stop ring secured on said support rod in spaced relation to said support plate.

* * * * *